Figure 1:
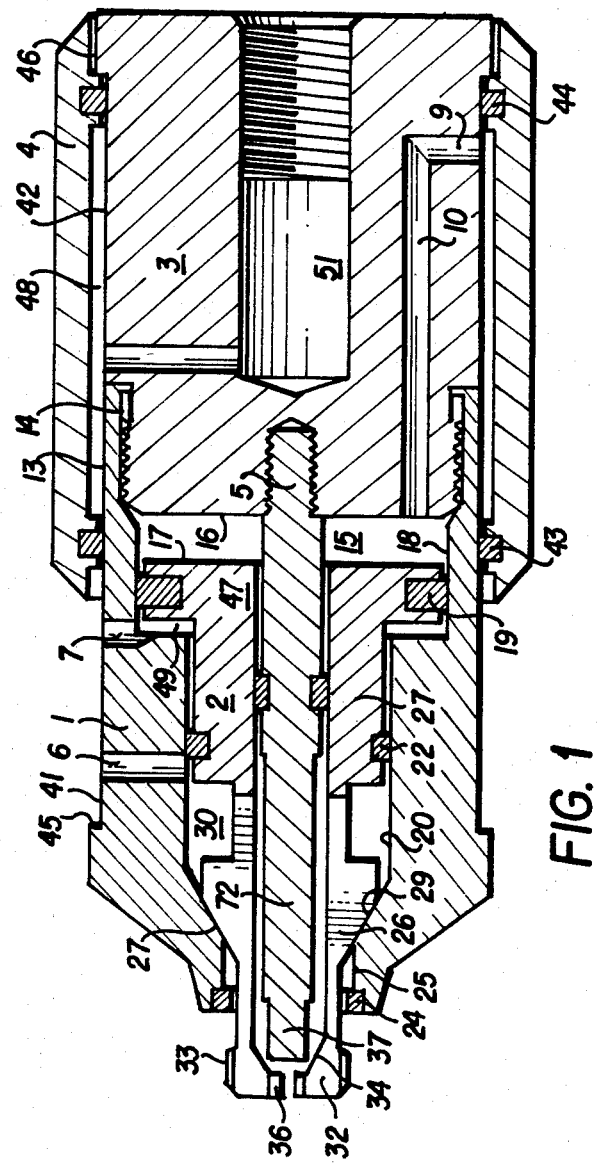

United States Patent [19]

Weh et al.

[11] Patent Number: 4,543,995
[45] Date of Patent: Oct. 1, 1985

[54] PIPE COUPLING HAVING LINE PRESSURE ACTUATED THREADED SEGMENTS

[76] Inventors: Erwin Weh; Wolfgang Weh, both of Siemensstrasse 5, D-7918 Illertissen, Fed. Rep. of Germany

[21] Appl. No.: 643,616

[22] PCT Filed: Dec. 23, 1983

[86] PCT No.: PCT/DE83/00217
§ 371 Date: Aug. 20, 1984
§ 102(e) Date: Aug. 20, 1984

[87] PCT Pub. No.: WO84/02566
PCT Pub. Date: Jul. 5, 1984

[30] Foreign Application Priority Data

Dec. 23, 1982 [DE] Fed. Rep. of Germany ....... 3247784

[51] Int. Cl.[4] .............................................. F16L 37/28
[52] U.S. Cl. .................................. 137/614.06; 285/35; 285/306; 251/149.9
[58] Field of Search ........................ 137/614, 614.06; 251/149.9; 285/34, 35, 83, 102, 306

[56] References Cited

U.S. PATENT DOCUMENTS

| | | | |
|---|---|---|---|
| 1,850,879 | 3/1932 | Hunt | 251/149.9 |
| 2,533,637 | 12/1950 | Tear | 285/102 |
| 3,291,442 | 12/1966 | Cranage | 285/34 X |
| 3,727,952 | 4/1973 | Richardson | 285/101 |
| 3,757,836 | 9/1973 | Masuda | 285/35 X |

Primary Examiner—A. Michael Chambers
Assistant Examiner—John C. Fox
Attorney, Agent, or Firm—Armstrong, Nikaido, Marmelstein & Kubovcik

[57] ABSTRACT

The coupling is provided with a cylinder (15, 49) within which a piston can be moved under pressure in one direction or the other. The piston has attached to it a clamping device in the form of jaws (32) which are adapted to be pressed together radially inwards and which are adapted to be fixed in a spread-apart position. The outer circumferential surface (41, 42) of the cylinder has provided on it a sleeve (4) which is adapted to be displaced and which is capable of occupying several positions, the jaws being pressed together in one of said positions and the jaws being spread apart in another position, and in a third position pressurized air can be applied to a connection.

11 Claims, 12 Drawing Figures

PIPE COUPLING HAVING LINE PRESSURE ACTUATED THREADED SEGMENTS

The present invention refers to a plug coupling according to the generic clause of patent claim 1.

A plug coupling of this type is known from U.S. Pat. No. 1,297,719. This plug coupling uses a sleeve which is attached to the outer side of the pressure conduit and which has in the rear end wall thereof openings through which clamping jaws extend, one side of said clamping jaws being attached to a fastening member. The clamping jaws engage a thread of a thread connection means, which is inserted into said sleeve, due to the fact that their free ends are provided with inclined surfaces cooperating with inclined surfaces provided on the inner side of said sleeve. In order to achieve pressure-sealed clamping, it is necessary to manually rotate the fastening member relative to the pressure conduit. Furthermore, pressure supply cannot be effected until the coupling operation has been finished.

The present invention is based on the task of providing a plug coupling in the case of which the coupling and decoupling operations are effected by means of the pressure medium supplied and in the case of which the pressure medium is prevented from flowing out of the pressure conduit in the decoupled condition.

In accordance with the invention, this task is solved by a plug coupling having the features of the characterizing clause of patent claim 1.

In the various positions of the sleeve which is adapted to be axially displaced on the cylindrical housing it is, on the one hand, possible to prevent the pressure medium from flowing out in the decoupled condition; and, on the other hand, the piston, which has pressure applied thereto, presses the clamping jaws together so that said clamping jaws can be inserted into the thread connection means. In another position of the sleeve, the pressure medium displaces the piston in the opposite direction and presses the clamping jaws into the thread, a passage of pressure medium to the pressure medium actuated device being permitted in an additional position. The displacement of the sleeve takes place in the direction of coupling and decoupling, respectively, so that a smooth process is obtained.

Preferred embodiments of the plug coupling according to the invention are characterized in the subclaims.

U.S. Pat. No. 2,388,179 describes a plug coupling in the case of which the clamping jaws are pressed together by manually pushing a ring, which runs on inclined surfaces, in the direction of the thread connection means.

The plug coupling according to the invention is particularly suitable for coupling a pressure conduit to pressure medium actuated devices which are to be tested.

Figure 2A:
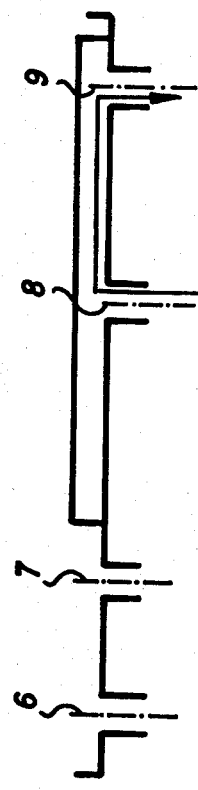
Figure 2B:
Figure 2C:
Figure 2D:
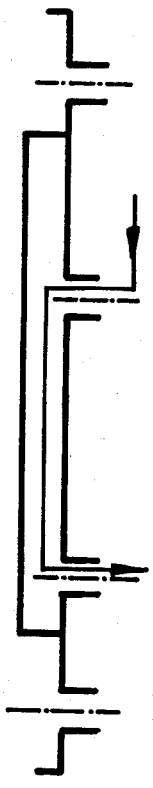
Figure 2E:
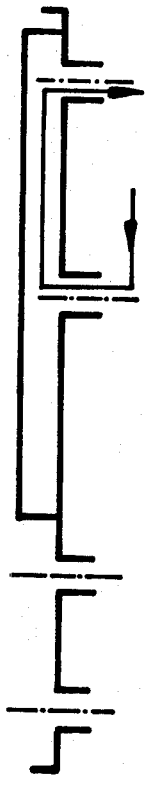
Figure 3:
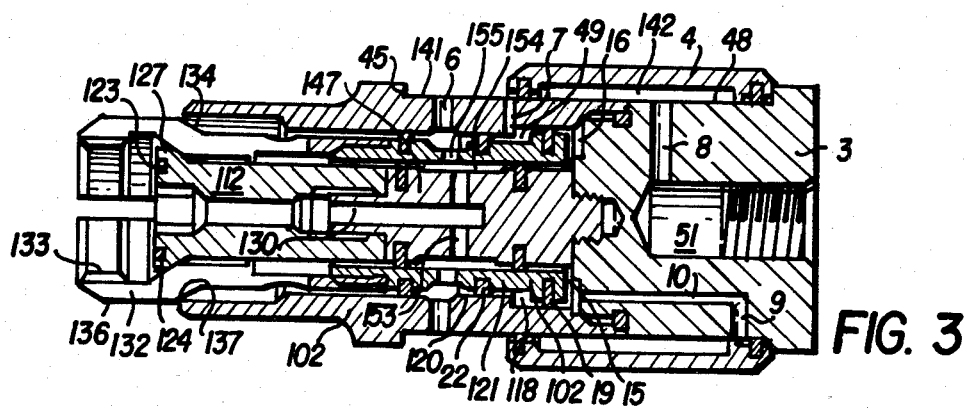

Embodiments of the plug coupling according to the invention will now be described while making reference to the drawings, in which FIG. 1 shows a longitudinal section through a first embodiment of the plug coupling according to the invention, FIGS. 2a to 2e show, in a schematic representation, the various functional positions of the plug coupling according to FIG. 1, FIG. 3 shows a longitudinal section through a second embodiment of the plug coupling according to the invention, and FIGS. 4a to 4e show, in a schematic representation, the various functional positions of the plug coupling according to FIG. 3.

Optimum way of carrying out the invention:

According to FIG. 1, a cylindrical member 1 is connected to a cylindrically designed core 3 in a pressure-sealed manner, preferably via a thread 13 and a sealing means 14. In the interior of the cylindrical member 1, a fastening member 2 is guided in a longitudinally displaceable manner on a pin 5 which is centrally fastened in the end face 16 of the core 3. One end face 17 of the fastening member 2 defines together with the end face 16 of the core 3 and together with an enlarged cylindrical bore 18 in the cylindrical member 1 a first cylinder space 15, the end face of the fastening member 2, which has a pistonlike configuration, being guided by means of a seal 19 in a pressure-sealed manner in the direction of the cylindrical bore 18.

The cylindrical member 1 is provided with an additional, narrower cylindrical bore 20 in which the central portion 21 of the fastening member 2 is guided such that it is sealed in a pressure-tight manner via a seal 22.

In the direction of the test connection point, the cylindrical member 1 may have the configuration of a mouthpiece, i.e. it may be provided with a tapering diameter. The end face 23 has inserted therein a sealing ring 24 which, in the connected condition, abuts in a pressure-sealed manner on the end face of the device to be tested.

Also the interior of the cylindrical member 1 tapers frusto-conically towards the end face 23 and defines a bore 25 through which the fastening section 26 of the fastening member 2 projects. A frustoconical circumferential surface 27 of the fastening section 26 slides on the frustoconical inner wall 29 of the cylindrical member 1.

Between the fastening section 26 and the end face of the piston member 21, a second cylinder space 30 is defined by an annular recess in the fastening member 2. The fastening section 26 is longitudinally slotted several times, preferably three or four times, so that a plurality of jaws 32 is obtained, said jaws having on the circumference of the front end of the fastening member 2 a thread 33 fitting into the internal thread of the device to be tested. The diameter of the pin 12 in the area of the fastening section 26 is smaller than the diameter of said pin in the area of the piston member 21 so that the jaws 33 can be pressed together towards the longitudinal axis of the device when the fastening member 2 is moved out of the cylindrical member 1 towards the left-hand side in FIG. 1.

On the other hand, the interior of the fastening member 2 is provided with a frustoconical inclined surface 34, which extends towards the jaws 32 and which ends in a cylindrical bore 36, the cylindrical end 37 fitting into said cylindrical bore in such a way that, in the inserted condition, the thread 33 fixedly engages the internal thread of the device to be tested. The outer circumferential surface 41 of the cylindrical member 1 and the outer circumferential surface of the core 3, which are, preferably, in alignment with each other, have attached thereto a sliding sleeve 4 which is adapted to be longitudinally displaced and which is sealed off with respect to the outer circumferential surfaces 41, 42 via sealing means 43, 44. The movement of the sliding sleeve 4 is limited by preferably annular stop means 45, 46 provided on said outer circumferential surfaces 41 and 42. In the area located between the sealing means 43, 44, the sliding sleeve 4 has an interior diameter exceeding the outer circumferential surfaces 41 and 42 in size in such a way that a cylindrical interspace is provided.

The sliding sleeve can be moved to several positions which will be described hereinbelow on the basis of FIGS. 2a to 2e. In these positions, different paths for the pressure medium are provided. In the case of the embodiment, these paths are defined by bores in the core 3 and in the cylindrical member 1.

In detail, it is such that a preferably central connection bore 51, which has connected thereto the pressure conduit preferably by means of a thread, communicates via a radial bore 8 in the core 3 with the interspace 48 defined between the outer circumferential surface 42 of the core 3 and the inner circumferential surface of the sliding sleeve. The position of the bore 8 is chosen such that it is open in all positions of the sliding sleeve 4, i.e. such that the bore 51 always supplies pressure medium, in particular pressurized air, to the interspace 48 via the bore 8.

An additional pressure path extending between the interspace 48 and the first cylinder space 15 is defined via the radial perpendicular bore 9 and the longitudinal bore 10 in the core 3, said bore 9 being positioned such that it communicates with the interspace 48 only if the sliding sleeve 4 is in its rearmost position, said position being the outermost right position in FIG. 1.

The first cylinder space 15 communicates with the ambient air via a radial bore 7 in the outer circumferential surface 41 of the cylindrical member 1 when the sliding sleeve 4 is in its rearmost position (FIG. 1, FIGS. 2a and 2e). In all other positions (FIGS. 2b to 2d), the bore 7 establishes a pressure connection between the interspace 48 and the back 49 of the piston section 47 of the fastening member 2.

An additional radial bore 6 in the outer circumferential surface 41 of the thread member 1 connects the ambient air to the second cylinder space 30 except in cases in which the sliding sleeve 4 is in its outermost left position (FIG. 1, FIG. 2c) in which the interspace 48 is connected to the second cylinder space 30.

Reference is made to the fact that it is also possible to provide several corresponding bores instead of the respective single bores 6, 7, 8, 9, 10.

Furthermore, the bores 6, 7, 8, 9 need not extend perpendicularly to the longitudinal axis of the device, but it would also be possible to arrange said bores such that they extend at an inclined angle.

Furthermore, reference is made to the fact that all elements of the device, with the exception of the sealing means, may preferably consist of metal, in particular of aluminum, steel or brass and will be turned parts. In individual cases it may also be possible to use plastic material.

On the basis of FIGS. 2a to 2e, the function of the device according to the invention is now described:

In the first position according to FIG. 2a, the cylinder space 15 has applied pressure thereto by the pressure conduit 51 via the bore 8, the interspace 48, the bores 9 and 10, whereas the rear space 49 communicates with the ambient air via the bore 7. Hence, the fastening member 2 is displaced towards the left in FIG. 1 so that the jaws 32 project beyond the cylindrical member 1 and are pressed centrally inwards via the inclined surfaces 27, 29. It follows that, when said jaws are applied to the device to be tested, they can easily be inserted into the threaded hole so that no troublesome screwing together is necessary. The end face of the device to be tested then abuts on the sealing ring 24 so that the means according to the invention cannot move to the left any further.

In view of the fact that, when being applied, the means is practically held only at the sliding sleeve 4 by one hand and is moved and forced in the direction of the connection point, the sliding sleeve 4 will now be displaced on the outer circumferential surfaces 41 and 42, respectively, towards the left in FIG. 1 and reaches thus a second position according to FIG. 2b in which the pressure applied to the first cylinder space 15 is removed via the bores 10, 9 communicating now with the ambient air, whereas the rear space 49 has applied pressure thereto by the bore 51 via the bore 8, the interspace 48 and the bore 7 so that the fastening member 2 moves towards the right in FIG. 1. In the course of this movement, the inclined surface 34 runs on the front edge of the pin 12 so that the jaws 32 are spread apart and the thread 33 engages the internal thread of the device to be tested in the same manner as if it had been screwed into said device.

During the continuous further displacement of the sliding sleeve 4, the outermost left position (FIG. 2c) is reached; said outermost left position has the effect that, on the one hand, the pressure in the rear space 49 is maintained and the fastening member 2 is retained in its right position so that the entire device remains stably fixed, whereas, on the other hand, pressurized air is guided from the interspace 48 via the bore 6 into the second cylinder space 30 and from said second cylinder space via the longitudinal slots between the jaws 32 into the device to be tested. It follows that in this outermost left position (FIG. 1) of the sliding sleeve 4, pressure is constantly applied to the device to be tested. In view of the fact that the end face of the device to be tested abuts on the sealing means 24, it is not possible that any air escapes.

The process of decoupling the means according to the invention from the device to be tested takes place in the opposite direction, starting with the return movement of the sliding sleeve 4 to the fourth position of FIG. 2d, which corresponds to the second position according to FIG. 2b, whereby the supply of pressure to th device to be tested is blocked. Due to the pressure which still exists in the rear space 49, the fastening member 2 still remains fixed.

Only after a further return movement of the sliding sleeve 4 to the starting position (FIG. 2e) corresponding to FIG. 2a, the bore 7 is again connected to the ambient air so that the air can escape from the rear space 49, pressure being simultaneously applied to the first cylinder space 15 via the bores 9, 10. The fastening member 2 is in this case moved towards the left in FIG. 1, the inclined surfaces 27, 29 come into contact with each other and the jaws 32 are again pressed together inwardly by means of said inclined surfaces 27, 29 so that the means according to the invention can again be retracted by a single longitudinal movement.

FIG. 3 shows an additional embodiment of the plug coupling according to the invention, said embodiment being adapted to be connected to an external thread.

The cylindrical member 101 is delimited on one side thereof by a cylindrically designed core 3. In the interior of the cylindrical member 101, a fastening member 102 is supported in a longitudinally displaceable manner on a pin 112 which is centrally fixed in the end face 16. One end face of the fastening member 102 defines together with the end face 16 of the core 3 and together with an enlarged cylindrical bore in the cylindrical member 101 the first cylinder space 15, the end face of the fastening member 102, which has a pistonlike configuration, being guided by means of a seal 19 in a pressure-sealed manner in the direction of the cylindrical bore. The cylindrical member 101 is provided with an additional, narrower cylindrical bore 120 in which the central portion 121 of the fastening member 102 is guided such that it is sealed in a pressure-tight manner via a seal 22.

In comparison with the pin 12 of the first embodiment, the pin 112 has a substantially increased thickness. Said pin 112 carries, at its end face facing the coupling point, a sealing means 123 and the circumferential surface of said pin is provided with an inclined surface 129 which extends away from said end face and which cooperates with an inclined surface 127 in the interior of clamping jaws 132 at the fastening member 112. The pin 112 is additionally provided with a central bore 131 as well as with at least one radial bore 153 leading to an interspace 154 which is defined between the fastening member 112 and the interior of the cylindrical member 101 and which is connected via at least one radial bore 115 to the radial bore 6 via the space 130. The coupling point is thus connected either to the ambient air or to the pressure conduit 51, depending on the position of the sleeve 4.

The clamping jaws 132 have on the inner side thereof a thread 133 which is adapted to be brought into engagement with the external thread of the device to be coupled. On the outer side of the clamping jaws 132, inclined surfaces 134 are provided which are in engagement with the end edge 137 of the cylindrical member 101.

The outer circumferential surface 141 of the cylindrical member 101 and the outer circumferential surface 142 of the core 3, which are, preferably, in alignment with each other, have attached thereto—just as in the case of the first embodiment—the sliding sleeve 4 in a longitudinally displaceable manner.

The bores 6, 7, 8, 9 and 10 correspond to those of the first embodiment according to FIG. 1, measures having, however, been taken for providing a connection between the bore 6 and the central bore 131, as has already been described hereinbefore.

The function of the means according to FIG. 3 corresponds to that of the means according to FIG. 1, as is schematically shown in FIGS. 4a to 4e.

Figure 4A:
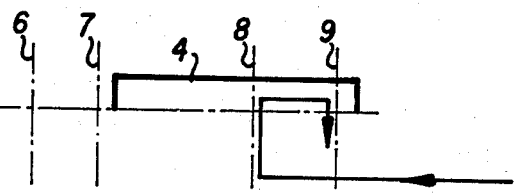

In accordance with the position of FIG. 4a, for example, the pressurized air supplied to the space 15 via the conduits 8, 9, 10 has the effect that the fastening member 102 is displaced towards the left in FIG. 3, whereby the clamping jaws 132 are forced open due to the inclined surfaces 127, 129. When the sleeve 4 has been moved to the position according to FIG. 4b, the pressure is removed from the space 15 and the rear space 49 has applied pressure thereto via the opening 7 so that the fastening member 102 moves towards the right in FIG. 3. In the course of this movement, the inclined surfaces 134 of the clamping jaws 132 run on the front edge 137 of the cylindrical member 101 and are, consequently, forced into the external thread of the device to be coupled.

During the continuous further displacement of the sliding sleeve 4, the outermost left position (FIG. 4c) is reached; said outermost left position has the effect that, on the one hand, the pressure in the rear space 49 is maintained and the fastening member 102 is retained in its right position so that the entire plug coupling remains stably fixed, whereas, on the other hand, pressurized air now flows from the interspace 48 via the bore 6 into the central bore 131 via the bores 155, the interspace 154, the bore 153 and is supplied to the coupled device.

Figure 4B:
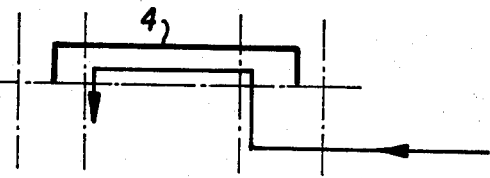
Figure 4C:
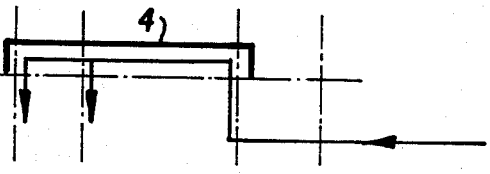
Figure 4D:
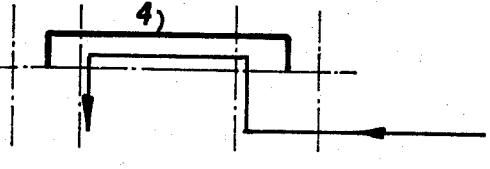
Figure 4E:
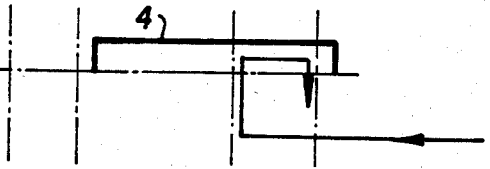

The process of decoupling takes place in the opposite direction, starting with the return movement of the sliding sleeve 4 to the fourth position of FIG. 4d, which corresponds to the second position according to FIG. 4b, whereby the supply of pressurized air through the central bore 131 is blocked. Due to the pressure which still exists in the rear space 49, the fastening member 102 still remains fixed.

Only after a further return movement of the sliding sleeve 4 to the starting position (FIG. 4e) corresponding to FIG. 4a, the bore 7 is again connected to the ambient air so that the air can escape from the rear space 49, pressure being simultaneously applied to the first cylinder space 15 via the bores 9, 10. The fastening member 102 is in this case moved towards the left in FIG. 3, the inclined surfaces 127, 129 come into contact with each other and force the clamping jaws 132 apart so that the plug coupling can be detached again by a single longitudinal movement.

Reference is made to the fact that the means according to the invention cannot only be used for testing whether devices operating under pressure are in working order, but can be used in every case in which a possibility of rapidly coupling and decoupling a pressure supply is to be provided.

We claim:

1. A plug coupling for providing a pressure-sealed connection between a pressure conduit and a pressure medium actuated device provided with a thread connection means, a cylindrical housing, which is connected to said pressure conduit, being sealingly designed at its end face facing the thread connection means, and a fastening member which is adapted to be axially displaced relative to the housing having, at its end facing the thread connection means, clamping jaws which are provided with a thread and which are adapted to be brought into engagement with the thread connection means, and said clamping jaws being adapted to be radially adjusted via an inclined surface arrangement in the case of axial displacement of the fastening member, characterized in that the fastening member (2, 102) is designed as a piston (21, 47) guided in a stepped axial bore (18, 20; 118, 120) of the housing (1), that the piston (21, 47) is adapted to have applied thereto pressure in both axial directions by means of the pressure medium via a plurality of pressure paths (7 to 10), that the pressure conduit is adapted to be connected to the pressure medium actuated device via pressure paths (6, 8), that on the outer circumferential surface (41, 42; 141, 142) of the housing (1) an axially displaceable sleeve (4) is provided, which is sealed with respect to said outer circumferential surface (41, 42) at its two axial ends and which leaves open therebetween an annular interspace (48), and that the pressure paths (6, 7, 9, 10) are arranged in such a way that, depending on the position of the sleeve (4), they communicate with the pressure conduit (51) or with the ambient air.

2. A plug coupling according to claim 1, characterized in that the piston (21, 47) is guided on an axial pin (12) which is fixed in position.

3. A plug coupling according to claim 2, characterized in that the clamping jaws (32, 132) are adapted to be fixed in their position of engagement.

4. A plug coupling according to one of the preceding claims, characterized in that the interior space (15, 49) of the cylindrical housing is delimited, on one side thereof, by the end face (16) of a core (3) in which a bore (51) is provided which, via a pressure path (8), communicates with the interspace (48) between the outer circumferential surface (41, 42) and the sleeve (4) in all positions of the sleeve (4).

5. A plug coupling according to claim 4, characterized in that a pressure conduit path (9, 10) is provided in the core (3) between the end face (16) and the interspace (48), said pressure conduit path connecting, in the insertion position of the plug coupling, the interspace (48) to the cylinder space (15) located at the piston side facing away from the thread.

6. A plug coupling according to claim 1, characterized in that the cylinder space (49) defined at the piston end face toward from the thread connection means (33; 133) communicates with the outer circumferential surface (41) of the cylindrical housing (1; 101) via a bore, said bore (7) being arranged in such a way that it communicates with the ambient air in the coupling position of the sleeve (4), whereas in the other positions of the sleeve (4) said bore guides pressure media from the interspace (48) into the cylinder space (49).

7. A plug coupling according to claim 1, characterized in that the thread connection means (33; 133) communicates with the outer circumferential surface (41; 141) of the cylindrical housing (1; 101) via a bore (6) which is covered by the sleeve (4) only in the coupled position of the plug coupling and which applies compressed air to the thread connection means (33; 133) via the interspace (48).

8. A plug coupling according to claim 1, characterized in that the cylindrical housing and the core (3) are designed as a fastenable cylindrical member (1; 101), in particular as a cylindrical member which can be screwed together, the connection opening through which the clamping jaws (32, 132) project being located at the cylindrical member end face facing away from the core (3).

9. A plug coupling according to claim 8, characterized in that in the interior of the cylindrical member (1) inclined surfaces (27) are provided in the vicinity of the connection opening, said inclined surfaces cooperating with the inclined surfaces (29) of the clamping jaws (32).

10. A plug coupling according to claim 1, characterized in that the piston (21, 47) is guided by means of seals (19, 22).

11. A plug coupling according to claim 2, characterized in that the pin (112) has provided therein a central bore (130), which, via at least one radial bore (153), communicates with the pressure conduit (51) or with the ambient air depending on the position of the sleeve (4).

* * * * *